US011247935B2

(12) United States Patent
Comte et al.

(10) Patent No.: US 11,247,935 B2
(45) Date of Patent: Feb. 15, 2022

(54) BETA-QUARTZ GLASS-CERAMICS WITH HIGH ZINC CONTENT

(71) Applicant: Eurokera, Jouarre (FR)

(72) Inventors: Marie Comte, Fontenay aux Roses (FR); Tiphaine Ogier, Paris (FR)

(73) Assignee: EUROKERA, Jouarre (FR)

( * ) Notice: Subject to any disclaimer, the term of this patent is extended or adjusted under 35 U.S.C. 154(b) by 0 days.

(21) Appl. No.: 16/620,302

(22) PCT Filed: Jun. 6, 2018

(86) PCT No.: PCT/EP2018/064912
§ 371 (c)(1),
(2) Date: Dec. 6, 2019

(87) PCT Pub. No.: WO2018/224556
PCT Pub. Date: Dec. 13, 2018

(65) Prior Publication Data
US 2020/0140322 A1 May 7, 2020

(30) Foreign Application Priority Data
Jun. 7, 2017 (FR) ...................................... 1755050

(51) Int. Cl.
*C03C 10/14* (2006.01)
*C03C 4/02* (2006.01)
*C03B 32/02* (2006.01)
*C03C 10/00* (2006.01)

(52) U.S. Cl.
CPC .......... *C03C 10/0027* (2013.01); *C03B 32/02* (2013.01); *C03C 4/02* (2013.01); *C03C 10/0009* (2013.01); *C03C 10/0054* (2013.01); C03C 2204/00 (2013.01)

(58) Field of Classification Search
CPC ........................ C03C 10/0027; C03C 10/0009
See application file for complete search history.

(56) References Cited

U.S. PATENT DOCUMENTS

| 4,461,839 A | 7/1984 | Rittler | |
| 8,722,554 B2 * | 5/2014 | Comte | ................ C03C 10/0054 501/68 |
| 2012/0035041 A1 * | 2/2012 | Comte | ................ C03C 10/0054 501/32 |
| 2013/0098903 A1 * | 4/2013 | Di Giovanni | ........... C03C 17/00 219/622 |
| 2014/0135201 A1 * | 5/2014 | Chauvel-Melscoet | ....................... C03C 10/0036 501/4 |
| 2014/0141227 A1 * | 5/2014 | Melscoet-Chauvel | ....................... C03C 14/006 428/220 |
| 2014/0141959 A1 * | 5/2014 | Melscoet-Chauvel | .... C03C 4/02 501/32 |

FOREIGN PATENT DOCUMENTS

| DE | 19939787 A1 | 2/2001 |
| EP | 0220333 A1 | 5/1987 |
| FR | 2955574 A1 | 7/2011 |

OTHER PUBLICATIONS

International Search Report & Written Opinion relating to International Application No. PCT/EP2018/064912.

* cited by examiner

*Primary Examiner* — Karl E Group
(74) *Attorney, Agent, or Firm* — Dinsmore & Shohl, LLP

(57) ABSTRACT

The present application provides LAS type transparent glass-ceramics of β-quartz of composition containing a high content of zinc, articles constituted at least in part of said glass-ceramics, glasses precursors of said glass-ceramics (with a low viscosity at high temperature), and also a method of preparing said articles. Said glass-ceramics present a composition, free of arsenic oxide and antimony oxide, except for inevitable traces, expressed as percentages by weight of oxides, containing: 64.5% to 66.5% of $SiO_2$; 19.0% to 20.6% of $Al_2O_3$; 3.0% to 3.6% of $Li_2O$; 0 to 1% of MgO; 1.7% to 3.4% of ZnO; 2% to 3% of BaO; 0 to 3% of SrO; 0 to 1% of CaO; 2% to 4% of $TiO_2$; 1% to 2% of $ZrO_2$; 0 to 1% of $Na_2O$; 0 to 1% of $K_2O$; with $Na_2O + K_2O + BaO + SrO + CaO \leq 6\%$; optionally up to 2% of at least one fining agent comprising $SnO_2$; and optionally up to 2% of at least one coloring agent.

11 Claims, No Drawings

BETA-QUARTZ GLASS-CERAMICS WITH HIGH ZINC CONTENT

CROSS-REFERENCE TO RELATED APPLICATIONS

This application claims the benefit of priority under 35 U.S.C § 365 of International Patent Application Serial No. PCT/EP2018/064912 filed on Jun. 6, 2018 designating the United States of America, the content of which is relied upon and incorporated herein by reference in its entirety, which in turn claims the benefit of priority under 35 U.S.C. § 119 of French Patent Application Serial No. 1755050 filed on Jun. 7, 2017, the content of which is relied upon and incorporated herein by reference in its entirety.

The context of the present application is that of transparent low expansion glass-ceramics containing a solid solution of β-quartz as the main crystalline phase. The present application relates more particularly to:

- transparent glass-ceramics of the lithium aluminosilicate (LAS) type containing a solid solution of β-quartz as the main crystalline phase;
- articles constituted, at least in part, of these glass-ceramics;
- lithium aluminosilicate glasses, precursors for these glass-ceramics; and
- a method of preparing these articles.

Transparent glass-ceramics of the lithium aluminosilicate (LAS) type containing a solid solution of β-quartz as the main crystalline phase have been in existence for more than 20 years. They are described in numerous patent documents, and in particular in U.S. Pat. No. 5,070,045 and patent application WO 2012/156444. They are used in particular appliances as the material for constituting cooktops, cooking utensils, microwave oven plates, fireplace windows, fireplace inserts, stove windows, oven doors (in particular for pyrolytic and catalytic ovens), and fire windows.

In order to obtain such glass-ceramics (and more precisely in order to eliminate inclusions of gas within the precursor molten glass), conventional fining agents, $As_2O_3$ and/or $Sb_2O_3$, have been in use for a long time. Given the toxicity of these two elements and the ever more severe regulations that are in force, it is desirable to avoid using these (toxic) fining agents in the fabrication of the precursor glass. For environmental considerations, the use of halogens such as F and Br, which might have taken the place, at least in part, of said conventional fining agents $As_2O_3$ and $Sb_2O_3$ are likewise no longer desirable. $SnO_2$ has been proposed as a substitute fining agent (see in particular the teaching of patent documents U.S. Pat. Nos. 6,846,760, 8,053,381, and WO 2012/156444). It is being used more and more. Nevertheless, at a similar fining temperature, it is found to be less effective than $As_2O_3$. In general manner, and particularly in the context of using $SnO_2$ as a fining agent, in order to facilitate fining, it is advantageous to have (precursor) glasses that have low viscosities at high temperature.

While they are in use, cooktops are associated with heating means: radiant heating means or induction heating means. The requirements applicable to values for the (linear) coefficient of thermal expansion (CTE) of the materials constituting such cooktops are more or less constraining. Cooktops used with radiant heaters may be raised to a temperature as high as 725° C., and in order to withstand the thermal shocks and the thermal gradients that can arise in the cooktop, they have a CTE that generally lies in the range $-10 \cdot 10^{-7}$ per Kelvin ($K^{-1}$) to $+10 \cdot 10^{-7} K^{-1}$, and preferably in the range $-3 \cdot 10^{-7} K^{-1}$ to $+3 \cdot 10^{-7} K^{-1}$. Cooktops used with induction heaters are subjected to temperatures that are not so high (at most about 400° C., or even at most about 300° C.). Consequently, the cooktops used with radiant heaters are suitable for use with induction heaters.

For reasons of appearance, it is also desirable for a cooktop, even when transparent, to mask the elements that are placed under it, such as induction coils, electric wiring, and circuits for controlling and monitoring the cooking appliance. An opacifier may be deposited on the bottom face of such a cooktop or the material from which it is constituted may be strongly colored. If colored, some minimum level of transmission must nevertheless be conserved so that displays can be seen, e.g. as a result of light emitted by light-emitting diodes (LEDs) placed under the cooktop.

Lithium is one of the main ingredients of glass-ceramics (of the lithium aluminosilicate (LAS) type containing a solid solution of β-quartz as the main crystalline phase). At present, lithium is present in the composition of said glass-ceramics, generally at contents lying in the range 2.5% to 4.5%, and more generally contents in the range 3.6% to 4.0% by weight (expressed in terms of $Li_2O$), essentially as ingredient of the solid solution of β-quartz and as melting agent (flux) for the glass. It constitutes a flux of particularly high performance. At present, the supply of lithium is less reliable than it is used to be. In any event, this element is becoming more expensive. The reason for this recent pressure on the availability and the price of lithium lies in the increasing demand for lithium for producing lithium batteries. It would therefore be appropriate to be able to minimize the lithium content of glass-ceramics compositions (transparent glass-ceramics containing a solid solution of β-quartz as main crystalline phase).

The inventors have thus thought opportune to search transparent glass-ceramics (of the lithium aluminosilicate (LAS) type, containing a solid solution of β-quartz as the main crystalline phase) of composition that contains a relatively low content of lithium (see the above paragraph), that show a low CTE (and are thus suitable as constituent materials for cooktops to associate with radiant heating means (see above)), and that can be obtained from precursor glasses logically having a relatively low lithium content, under the usual working conditions of the conventional method (familiar to the person skilled in the art, comprising steps of melting, fining, cooling and shaping, and then heat treating the pieces to transform the precursor glass into the glass-ceramic (this thermal treatment being called ceramming)), advantageously with an improvement in the fining. As a result of their research, the inventors thus have the merit of proposing glass-ceramics of composition that associates specific contents of $Li_2O$ and of ZnO within a specified base (see below).

The literature mentions fluxing agents for glass, other than lithium. In the following book: "Non-metallic solids a series of monographs (editors: J. P. Roberts and P. Popper), Vol. 1, by P. W. McMillan, Glass-ceramics (Academic Press London and New York), 1964, pp. 74-75, the following are mentioned as fluxes (identified as oxides): $Na_2O$, $K_2O$, MgO, CaO, BaO, and also ZnO. Furthermore, it is specified in the Journal of Materials Science (2013), 48, pp. 4427-4437, that $Zn^{2+}$ and $Mg^{2+}$ ions can take the place of $Li^+$ ions in the crystalline phase of β-quartz. That document discusses the crystallization kinetics of glasses and the local environment of zinc in glasses and in glass-ceramics. It is stated that above 2% by weight of ZnO, the samples have a purple color that is attributed to diffusion. There is no data about the viscosity of glasses, about their devitrification, or their CTEs after crystallization. The glasses that are specifically described all have very high lithium contents (Li$_2$O≥4.7% by weight).

The prior art already described glass-ceramics of compositions that contain various more or less low contents of lithium and of zinc. Thus:

from aluminosilicate glasses that do not contain lithium but rather a high content of zinc, it is known that is possible to obtain glass-ceramics containing a β-quartz solid solution as the main crystalline phase. Nevertheless, such glass-ceramics are not transparent (they are opaque), their precursor glasses have a low viscosity at the liquidus temperature, and the heat treatments required for crystallizing (ceramming) said precursor glasses in order to obtain said glass-ceramics are lengthy (see the book "Glass-ceramic technology", 2$^{nd}$ edition, by Holland and Beall, pp. 116-117 (Wiley 2012));

U.S. Pat. No. 4,461,839 describes lithium aluminosilicate (LAS) type glass-ceramics that are colored, transparent, translucent or opaque, and that contain a solid solution of β-quartz or β-spodumene as the main crystalline phase. The compositions disclosed are very broad. They comprise arsenic oxide as fining agent, a specific color package and they are free of MgO;

U.S. Pat. Nos. 9,051,209 and 9,051,210 describe lithium aluminosilicate (LAS) type glass-ceramics that are transparent, containing a solid solution of β-quartz as the main crystalline phase and showing a controlled transmission curve. The compositions that are described, which are free from As$_2$O$_3$ and Sb$_2$O$_3$, contain tin oxide (SnO$_2$) as fining agent. They generally contain 2.5% to 4.5% by weight of Li$_2$O and 0 to 3% by weight of ZnO. The compositions that are exemplified contain high contents of Li$_2$O (3.8% by weight (U.S. Pat. Nos. 9,051,209 and 9,051,210) associated with low contents of ZnO (1.4% to 1.53% by weight (U.S. Pat. No. 9,051,209) and 1.41% to 1.52% by weight (U.S. Pat. No. 9,051,210));

patent application US 2015/0197444 also describes lithium aluminosilicate (LAS) type glass-ceramics that are transparent containing a solid solution of β-quartz as the main crystalline phase and showing a controlled transmission curve. The compositions that are described, which are free from As$_2$O$_3$ and Sb$_2$O$_3$, also contain tin oxide (SnO$_2$) as fining agent. They generally contain 2.5% to 4.5% by weight of Li$_2$O and 1% to 3% by weight of ZnO. The compositions that are exemplified contain low contents of ZnO (1.45% and 1.55% by weight), and most of them contain high contents of Li$_2$O (3.8% by weight);

U.S. Pat. No. 5,173,453 describes glass-ceramic articles having at least two zones (one of which is transparent) having different crystallizations, of composition containing 3.3% to 4% by weight of Li$_2$O and 2% to 5% by weight of ZnO. Most of the compositions that are exemplified contain high contents of SiO$_2$ (67.3% to 70.25% by weight). The compositions containing a low content of SiO$_2$ contain a high content of Al$_2$O$_3$ (21.0% to 21.5% by weight); and U.S. Pat. No. 8,318,619 describes β-quartz glass-ceramics that are transparent, and essentially not colored. Their compositions, which are free from As$_2$O$_3$ and Sb$_2$O$_3$, contain a specific combination of TiO$_2$, ZrO$_2$, and SnO$_2$, where TiO$_2$ is present in low quantity. They contain 3% to 4% by weight of Li$_2$O and 1% to 4% by weight of ZnO. Most of the compositions that are exemplified have a high level of SiO$_2$, lying in the range 67.0% to 69.3% by weight.

In such a context, the inventors have the merit of proposing glass-ceramics of composition that contains a "limited" content of Li$_2$O, which is compensated by a "high" content of ZnO; said glass-ceramics being transparent (at this point it is appropriate to recall the teaching of "Glass-ceramic technology, 2$^{nd}$ edition, by Holland and Beall, pp. 116-117" (see above)). In the narrow composition range that is specified (see below), the fluxing effect of said ZnO within the composition of the precursor glass for said glass-ceramics is found in completely unexpected manner to be better than that of Li$_2$O (said "better" fluxing effect thus further reducing the viscosity of the glass at high temperature and consequently enabling higher performance fining to be achieved). The inventors have the merit of proposing transparent glass-ceramics that are entirely suitable for use as the material constituting cooktops (both in the context of radiant heating and in the context of induction heating), insofar as they satisfy the following specifications:

the glass-ceramics are transparent (even if they are usually highly colored): at the intended utilization thickness (plates typically 1 millimeter (mm) to 8 mm thick, more generally 2 mm to 5 mm thick, and often 4 mm thick), said glass-ceramics have integrated transmission, TL (%), equal to or greater than 1% and a diffusion percentage less than 2%. Transmission measurements may be performed using a spectrophotometer having an integrating sphere, by way of example. On the basis of such measurements, the integrated transmission (TL (%)) in the visible range (between 380 and 780 nm) and the diffusion percentage (Diffusion (%)) are calculated using the standard ASTM D 1003-13 (under D65 illuminant with 2° observer);

they have CTE$_{25-700° C.}$ lying in the range +/−3·10$^{-7}$K$^{-1}$ (−3·10$^{-7}$ K$^{-1}$≤CTE≤+3·10$^{-7}$ K$^{-1}$); and they have a precursor glass that possesses advantageous properties (advantageously similar to those of prior art glass-ceramics precursor glasses containing a similar or higher content of Li$_2$O), and possibly even better properties, in certain circumstances as far as the high-temperature viscosity is concerned, i.e.:

said precursor glass have a low viscosity at high-temperature (T$_{30Pa·s}$<1640° C., or indeed <1630° C., and possibly even <1620° C. (the effect of ZnO, which is more efficient than Li$_2$O to decrease high-temperature viscosity)), thereby facilitating fining.

Advantageously, also:

said precursor glass have a low liquidus temperature (<1400° C.) and a high viscosity at the liquidus (generally greater 200 Pa·s, more generally greater than 400 Pa·s, preferably greater than 500 Pa·s), which facilitates forming (cooling and shaping).

In other respects it is highly appreciated for said precursor glass to be capable of being transformed into glass-ceramic in a short length of time (<3 hours (h)), or indeed a very short length of time (<1 h), and/or, advantageously and, to also have a (electrical) resistivity at a viscosity of 30 pascal seconds (Pa·s) that is less than 50 ohm centimeters (Ω·cm) (preferably less than 20 Ω·cm). The man skilled in the art will understand (in view of the composition of the glass-ceramics below stated) that obtaining these two last properties, which are opportunely required for the precursor glass, raises no particular difficulty.

It is also particularly interesting for the transparent glass-ceramics proposed to have composition free of As$_2$O$_3$ and Sb$_2$O$_3$ (except for inevitable traces).

In a first aspect, the present application thus provides glass-ceramics of the lithium aluminosilicate type containing a solid solution of β-quartz as the main crystalline phase, and of composition, free of arsenic oxide and antimony oxide, except for inevitable traces, expressed in percentages by weight of oxides, that contains:

64.5% to 66.5% of $SiO_2$;
19.0% to 20.6% of $Al_2O_3$;
3.0% to 3.6% of $Li_2O$;
0 to 1% of MgO;
1.7% to 3.4% of ZnO;
2% to 3% of BaO;
0 to 3% of SrO;
0 to 1% of CaO;
2% to 4% of $TiO_2$;
1% to 2% of $ZrO_2$;
0 to 1% of $Na_2O$;
0 to 1% of $K_2O$;
with $Na_2O+K_2O+BaO+SrO+CaO \leq 6\%$;
optionally up to 2% of at least one fining agent comprising $SnO_2$; and
optionally up to 2% of at least one coloring agent.

The following may be specified concerning each of the ingredients involved (or potentially involved) in the above-specified composition at the specified contents (the extreme values of each of the ranges specified (above and below) being included in said ranges).

$SiO_2$ (64.5%-66.5%): the content of $SiO_2$ (a 64.5%) must be suitable for obtaining a precursor glass that is sufficiently viscous to limit problems of devitrification. The content of $SiO_2$ is limited to 66.5%, and preferably limited to 66%, insofar as the greater the content of $SiO_2$, the more the glass is difficult to melt.

$Al_2O_3$ (19.0%-20.6%): the presence of ZnO at the specified (rather large) quantities makes it critical to control the content of $Al_2O_3$ in order to limit devitrification phenomena. Excessive quantities of $Al_2O_3$ (>20.6%) make the composition more likely to devitrify (into mullite crystals or other crystals), which is not desirable. Conversely, quantities of $Al_2O_3$ that are too small (<19.0%) are unfavorable to nucleation and to the formation of small β-quartz crystals.

$Li_2O$ (3.0% to 3.6%): the inventors have thus shown that (partially) substituting $Li_2O$ with ZnO (which substitution is clearly advantageous insofar as ZnO is less expensive than $Li_2O$) leads to a significant reduction in the viscosity of the glass at high temperature, in the specified composition ranges (which is very advantageous for melting the glass and for the effectiveness of fining), and that, without significant impact on the transparency of the material and without any unacceptable increase in CTE. Advantageously, the $LiO_2$ content is less than 3.6%, most advantageously it is less than or equal to 3.5%. A minimum quantity of 3% by weight is nevertheless necessary in order to maintain sufficient viscosity at the liquidus and obtain a CTE from 25° C. to 700° C. lying in the range +/−3·10$^{-7}$ K$^{-1}$. Said $Li_2O$ content is advantageously greater than or equal to 3.1% (by weight). Said $Li_2O$ content is thus preferably: $3.1\% \leq Li_2O \leq 3.5\%$.

ZnO (1.7% to 3.4%): this element thus serves to reduce significantly the viscosity of the glass at high temperature (and does so to a greater extent than $Li_2O$). By forming part of the solid solution of β-quartz, it increases the CTE of the glass-ceramic and does so to a greater extent than does $Li_2O$, but to an extent that is nevertheless still moderate, thus making it possible to obtain glass-ceramics with CTEs from 25° C. to 700° C. lying in the range +/−3·10$^{-7}$ K$^{-1}$ (glass-ceramics that are suitable as the material constituting cooktops associated with radiant heating). When present in too great a quantity (>3.4%), it leads to unacceptable devitrification and to viscosity at the liquidus temperature that is too low. Preferably, its content lies in the range 1.7% to 2.8% by weight.

MgO (0 to 1%): this element is opportunely (but not compulsorily) present. In reference to its efficiency, when it is present, it has generally to be present at levels of at least 100 ppm. Otherwise stated, MgO is "not present" or is efficiently present, generally at a level in the range 0.01 to 1%. It is advantageously present at a level in the range 0.2 to 1%. Like ZnO, this element decreases high-temperature viscosity. It has less impact on devitrification. It is also present in the solid solution of β-quartz but it increases the CTE of the glass-ceramic very significantly. That is why its content has not to exceed 1%.

$TiO_2$ (2% to 4%) and $ZrO_2$ (1% to 2%): these elements enable the glass to nucleate and a transparent glass-ceramic to be formed. The joint presence of these two elements serves to optimize nucleation. Too high a content of $TiO_2$ makes it difficult to obtain a glass-ceramic that is transparent. Too great a content of $ZrO_2$ leads to unacceptable devitrification.

BaO (2% to 3%), SrO (0 to 3%), CaO (0 to 1%), $Na_2O$ (0 to 1%), and $K_2O$ (0 to 1%): SrO, CaO, $Na_2O$ and $K_2O$ are optionally present. To have an effect, each of said elements, when it is present, is generally present at levels of at least 100 ppm. Otherwise stated, SrO is "not present" or is efficiently present, generally at a level in the range 0.01 to 3% (see however later); CaO is "not present" or is efficiently present, generally at a level in the range 0.01 to 1%; $Na_2O$ is "not present" or is efficiently present, generally at a level in the range 0.01 to 1%; and $K_2O$ is "not present" or is efficiently present, generally at a level in the range 0.01 to 1%. These elements remain in the residual glass after crystallization. They decrease the viscosity of the glass at high temperature, they facilitate dissolution of $ZrO_2$ and they limit devitrification into mullite, however they increase the CTE of glass-ceramics. That is why the sum of these elements must be equal to or less than 6% ($Na_2O+K_2O+BaO+SrO+CaO \leq 6\%$). In the narrow composition range of glass-ceramics of the present application, the sum of these elements is advantageously less than 4% ($Na_2O+K_2O+BaO+SrO+CaO<4\%$). Advantageously, also in reference to the CTE value, the sum of $Na_2O+K_2O$ is within the range 0-1%, indeed less than 1% ($0 \leq Na_2O+K_2O \leq 1$, indeed $0 \leq Na_2O+K_2O<1$).

It may be observed that SrO is generally not present as an added raw material, insofar as it is an expensive material. In such a content (SrO not present as an added raw material), if SrO is present, it is present only as inevitable traces (<100 parts per million (ppm)) brought as an impurity in at least one of the raw materials used or in the cullet used.

Fining agents: the composition of the glass-ceramics advantageously includes at least one fining agent comprising $SnO_2$. Said at least one fining agent is present at a quantity that is effective (for performing chemical fining), and conventionally does not exceed 2% by weight. It is thus generally present in the range 0.05% to 2% by weight.

In a particularly opportune manner, for environmental reasons (see above), fining is obtained by using $SnO_2$—generally in the range 0.05% to 0.6%, preferably in the range 0.15% to 0.4% by weight of $SnO_2$—within the composition of the glass-ceramics of the present application which contains neither $As_2O_3$ nor $Sb_2O_3$, or which contains only inevitable traces of at least one of these toxic compounds ($As_2O_3+Sb_2O_3<1000$ ppm) (it is recalled incidentally at this point that said fining is made easier by the low viscosity at high temperature of the precursor glass (because of the presence of considerable quantities of ZnO substituting $Li_2O$)). If traces of at least one of these compounds ($As_2O_3$ and/or $Sb_2O_3$) are present, that is as a contaminating substance; for example this may be due to the presence of recycled materials of the cullet type (derived from old glass-ceramics fined with these compounds) in the charge of raw materials able to vitrify. Under such circumstances, the co-presence of at least one other fining agent, such as $CeO_2$, a chloride, and/or a fluoride is not excluded but, preferably, $SnO_2$ is present as the single fining agent.

For what purpose it may serve, it should be observed that the fining is made easier regardless of the exact nature of the at least one fining agent present, and that the absence of an effective quantity of chemical fining agent(s), or indeed the absence of any chemical fining agent, is not completely to be excluded: fining can then be performed thermally. This non-excluded variant is nevertheless not preferred in any way.

Coloring agents: the composition of the glass-ceramics advantageously includes at least one coloring agent. It is mentioned above that in the context of cooktops it is appropriate to mask the elements arranged under said cooktop. Said at least one coloring agent is present at an effective quantity (generally at least 0.01% by weight); it is conventionally present at at most 2% by weight or indeed at most 1% by weight. Said at least one coloring agent is conventionally selected from oxides of transition elements (e.g., $V_2O_5$, CoO, $Cr_2O_3$, $Fe_2O_3$ (see below), NiO, . . . ) and of rare earths (e.g., $Nd_2O_3$, $Er_2O_3$, . . . ). In preferred manner, vanadium oxide $V_2O_5$ is used since said vanadium oxide leads to low Infra-red absorption in the glass, which is advantageous for melting. The absorption in the visible it makes possible is generated during the ceramming treatment (during which it is partially reduced). It is particularly advantageous to combine $V_2O_5$ with other coloring agents such as $Cr_2O_3$, CoO, or $Fe_2O_3$ (see below), since that enables transmission to be modulated. The inventors have observed that by reducing the $Li_2O$ content, smaller quantities of $V_2O_5$ are needed for obtaining the same coloring of the glass-ceramic, which is also advantageous from a cost point of view (since $V_2O_5$ is an element that is quite expensive). With reference to the requirements set out below, for a thickness of 4 mm:

to have an integrated transmission (TL) less than 10%; preferably less than 4%,
while maintaining transmission:
  at 625 nm ($T_{625nm}$) greater than 1%, thus making it possible to pass light for display purposes from a LED emitting in the red and placed under the plate (cooktop);
  at 950 nm ($T_{950nm}$), lying in the range 50% to 75%, thus enabling infrared electronic touch controls to be used, that emit and receive at this wavelength; and
  at 1600 nm ($T_{1600nm}$), lying in the range 50% to 75%, thereby providing good heating performance for the plate (cooktop) without dangerous heating of materials placed in the proximity of the plate (cooktop), the combination specified below (% by weight of the overall composition) for coloring agents have been found to be particularly advantageous:

| | |
|---|---|
| $V_2O_5$ | 0.005% to 0.2% |
| $Fe_2O_3$ | 0.01% to 0.32% |
| $Cr_2O_3$ | 0% to 0.1% |
| CoO | 0% to 0.1%. |

With reference to the same requirements, the combinations specified below (% by weight of the overall composition) for coloring agents have been found to be more particularly advantageous:

| | |
|---|---|
| $V_2O_5$ | 0.01% to 0.2% (and preferably 0.015% to 0.1%) |
| $Fe_2O_3$ | 0.01% to 0.32% (and preferably 0.07% to 0.25%) |
| $Cr_2O_3$ | 0.01% to 0.04% |

(being understood that the given preferred ranges have not compulsorily, but only advantageously, to be considered together).

Among the coloring agents, $Fe_2O_3$ has a special place. It has an effect on color and it is actually often present, in a less or more important amount, as an impurity (e.g. coming from the raw materials). It is however not excluded to add some $Fe_2O_3$ to adjust the color. Its acceptable presence "in large quantity" in the composition of glass-ceramics of the present application makes it possible to use raw materials that are less pure and thus often less expensive.

The above-identified ingredients involved, or potentially involved, in the composition of glass-ceramics of the present application ($SiO_2$, $Al_2O_3$, $Li_2O$, MgO, ZnO, $TiO_2$, $ZrO_2$, BaO, SrO, CaO, $Na_2O$, $K_2O$, fining agent(s) (comprising $SnO_2$), and coloring agent(s)) can indeed represent 100% by weight of the composition of glass-ceramics of the present application, but, a priori, the presence of at least one other compound is not to be totally excluded, providing it is at low quantity (generally less than or equal to 3% by weight) and does not substantially affect the properties of the glass-ceramics. In particular, the following compounds may be present, at a total content of less than or equal to 3% by weight, each of them being present at a total content less than or equal to 2% by weight: $P_2O_5$, $B_2O_3$, $Nb_2O_5$, $Ta_2O_5$, $WO_3$, and $MoO_3$.

The above-identified ingredients involved, or potentially involved, in the composition of glass-ceramics of the present application ($SiO_2$, $Al_2O_3$, $Li_2O$, MgO, ZnO, $TiO_2$, $ZrO_2$, BaO, SrO, CaO, $Na_2O$, $K_2O$, fining agent(s) (comprising $SnO_2$), and coloring agent(s)), thus represent at least 97% by weight, or indeed at least 98% by weight, or indeed at least 99% by weight, or even 100% by weight (see above) of the composition of glass-ceramics of the present application.

The glass-ceramics of the present application thus contain $SiO_2$, $Al_2O_3$, $Li_2O$, ZnO, and MgO as essential ingredients for the solid solution of β-quartz (see below). This solid solution of β-quartz represents the main crystalline phase. This solid solution of β-quartz generally represents more than 80% by weight of the total crystallized fraction. It generally represents more than 90% by weight of said total crystallized fraction. The size of the crystals is small (typically less than 70 nm), which enables the glass-ceramics to be transparent (integrated transmission ≥1% and diffusion <2%).

Glass-ceramics of the present application contain about 10% to about 40% by weight of residual glass.

In a second aspect, the present application provides articles that are constituted at least in part out of a glass-ceramic of the present application as described above. Said articles are optionally constituted in full out of the glass-ceramic of the present application. Said articles advantageously comprise cooktops that are a priori bulk colored (see above). Nevertheless, that is not the only application for which they can be used. They can also constitute the component material of cooking utensils, microwave oven plates, fireplace windows, fireplace inserts, stove doors, and oven doors (in particular for pyrolytic and catalytic ovens), and fire windows, which may be colored or not.

In its third aspect, the present application provides aluminosilicate glasses that are precursors for the glass-ceramics of the present application, as described above. In characteristic manner, said glasses present a composition that makes it possible to obtain said glass-ceramics. Said glasses generally present a composition that corresponds to the composition of said glass-ceramics, but the correspondence is not necessarily complete insofar as the person skilled in the art is well aware that the heat treatments imposed on glasses in order to obtain glass-ceramics are likely to have some effect on the composition of the material. The glasses of the present application are obtained in conventional manner by melting a charge of raw materials able to vitrify (raw materials making them up being present in the appropriate proportions). Nevertheless, it can be understood (and will not surprise the person skilled in the art) that the charge in question may contain cullet. Said glasses are particularly interesting in that they have:

- a low viscosity at high temperature. It has been above indicated that said precursor glass possesses a low viscosity at high-temperature: $T_{30Pa\cdot s}<1640°$ C., or indeed <1630° C., and possibly even <1620° C.,
- associated advantageously with interesting devitrification properties, in particular compatible with performing forming methods by rolling, floating, and pressing, i.e. to a low liquidus temperature (<1400° C.) and a high viscosity at liquidus (>200 Pa·s, or indeed >400 Pa·s and preferably >500 Pa·s).

In other respects, it has to be noted that it is possible to obtain (from said precursor glasses) the glass-ceramics of the present application by performing ceramming cycles of short duration (less than 3 h), or indeed of very short duration (<1 h), and that the resistivity of said precursor glasses is low (resistivity less than 50 Ω·cm at a viscosity of 30 Pa·s (preferably less than 20 Ω·cm)).

In its last aspect, the present application provides a method of preparing an article constituted at least in part of a glass-ceramic of the present application, as described above.

Said method is a method by analogy.

In conventional manner, said method comprises heat treatment of a charge of raw materials able to vitrify (it being understood that such a charge able to vitrify may contain cullet (see above)) under conditions that ensure melting and fining in succession, followed by shaping the fined molten precursor glass (said shaping possibly being performed by rolling, by pressing, or by floating), followed by ceramming (or crystallization) heat treatment of the shaped fined molten precursor glass. The ceramming heat treatment generally comprises two steps: a nucleation step and another step of growing crystals of the solid solution of β-quartz. Nucleation generally takes place in the temperature range 650° C. to 830° C. and crystal growth in the temperature range 850° C. to 950° C. Concerning the duration of each of these steps, mention may be made in entirely non-limiting manner of about 5 minutes (min) to 60 min for nucleation and about 5 min to 30 min for growth. The person skilled in the art knows how to optimize the temperatures and the durations of these two steps as a function of the composition of the precursor glasses (in reference more particularly to the desired transparence).

Said method of preparing an article, constituted at least in part of a glass-ceramic of the present application thus comprises in succession:

melting a charge of raw materials able to vitrify, followed by fining the resulting molten glass (see above);

cooling the resulting fined molten glass and simultaneously shaping it to the shape desired for the intended article; and applying ceramming heat treatment to said shaped glass.

The main advantage of precursor glass of the present application should be recalled: said glasses present low high-temperature viscosity that allows them to be melted and fined (in particular by $SnO_2$) in optimized conditions.

The two successive steps of obtaining a shaped fined glass (precursor of the glass-ceramic) and ceramming said shaped fined glass may be performed immediately one after the other, or they may be spaced apart in time (on a single site or on different sites).

In characteristic manner, the charge of raw materials able to vitrify has a composition that makes it possible to obtain a glass-ceramic of the present application, thus having the composition by weight as specified above (advantageously including $SnO_2$ as a fining agent (in the absence of $As_2O_3$ and $Sb_2O_3$), preferably as the single fining agent). The ceramming performed on the glass obtained from such a charge is entirely conventional. It is mentioned above that said ceramming may be obtained in a short length of time (<3 h), or indeed in a very short length of time (<1 h).

In the context of preparing an article, such as a cooktop, the precursor glass is cut after being shaped and prior to being subjected to the ceramming treatment (ceramming cycle). It is generally also edged, rounded shaped and decorated. Such forming and decorating steps may be performed before or after the ceramming heat treatment. By way of example, the decorating may be performed by screen-printing.

The present application is illustrated below by the following examples and comparative examples.

EXAMPLES

To produce batches of 1 kilogram (kg) of precursor glass, the raw materials, in the proportions specified in the first portion of tables 1 (1-A and 1-B) and 2 below (proportions expressed oxides (in % of oxides by weight)), were mixed together carefully.

Tables 1-A' and 1-B' show said proportions of oxides expressed in molar percentages.

The mixtures were placed for melting in crucibles made of platinum. The crucibles containing said mixtures were then placed in a furnace preheated to 1550° C. They were subjected therein to a melting cycle of the following type:

temperature rise from 1550° C. to 1670° C. in 1 h;

temperature maintained at 1670° C. for 5 h 30.

The crucibles were then extracted from the furnace and the molten glass was poured onto a preheated steel plate. It was rolled on the plate to a thickness of 6 mm. Glass plates were thus obtained. They were annealed at 650° C. for 1 h and subsequently cooled down slowly.

The properties of the resulting glasses are given in the second portion of the tables 1 (1-A and 1-B) and 2 below.

Viscosities were measured using a rotational viscosimeter (Gero).

$T_{30Pa \cdot s}$ (° C.) corresponds to the temperature at which the viscosity of the glass was 30 Pa·s.

The resistivity (ρ) of the glass was measured at high temperature, on a thickness of 1 centimeter (cm) of molten glass, using a 4-point contact RLC bridge. The tables give the resistivity ($\rho_{30\ Pa \cdot s}$) measured at the temperature at which the viscosity was 30 Pa·s.

$T_{liq}$ (° C.) is the liquidus temperature. The liquidus is actually given by a range of viscosities temperatures and viscosities: the highest temperature corresponds to the minimum temperature at which no crystal was observed, the lowest temperature corresponds to the maximum temperature at which crystals were observed.

The devitrification characteristics (low and high liquidus temperatures) were determined as follows. 0.5 cubic centimeter ($cm^3$) samples of glass were subjected to the following heat treatment:

placing in a furnace preheated to 1430° C.;
maintaining this temperature for 30 min;
lowering to the test temperature, T, at a rate of 10° C./min;
maintaining this temperature for 17 h; and
quenching the samples.

The crystals present, if any, were observed by optical microscopy.

The ceramming cycle performed was as follows:

rapid temperature rise up to 500° C.;
temperature rise from 500° C. to 650° C. at a heating rate of 23° C./min;
temperature rise from 650° C. to 820° C. at a heating rate of 6.7° C./min;
temperature rise from 820° C. to the (specified) maximum (ceramming) temperature Tmax at a heating rate of 15° C./min;
maintaining this temperature Tmax for 7 min;
cooling down to 850° C. at 35° C./min; and
cooling down to ambient temperature as a function of the inertia of the furnace.

For certain examples (examples 1 to 4) the results are given as obtained at the end of two different ceramming treatments (Ceram 1 and Ceram 2, which differ in the value of their Tmax).

The properties of the glass-ceramics obtained are given in the last portions of Tables 1 (1-A and 1-B) and 2 below.

The coefficients of thermal expansion from ambient temperature (25° C.) to 700° C. ($CTE_{25-700°\ C.}$) were measured on bar-shaped samples of glass-ceramic with a high temperature dilatometer (DIL 402C, Netzsch) at a heating rate of 3° C./min.

The aspect of the samples (transparency, color) is given in the result table.

These glass-ceramics contain a solid solution of β-quartz as the main crystalline phase (as verified by X-ray diffraction). Thus, example 6 contains 95% (by weight) of solid solution of β-quartz (relative to the total crystallized fraction) with the β-quartz crystals having a mean size of 35 nm. The percentages of solid solution of β-quartz and the mean crystal size were determined using the Rietveld method.

Measurements of total transmission (TL) and of diffusion were performed at 4 mm with a Varian spectrophotometer (Cary 500 Scan model), fitted with an integrating sphere. On the basis of those measurements, the integrated transmission (TL (%)) in the visible range (between 380 and 780 nm) and the diffusion percentage (Diffusion (%)) were calculated using the standard ASTM D 1003-13 (under D65 illuminant with a 2° observer). Transmission values (at 625 nm ($T_{625nm}$), at 950 nm ($T_{950nm}$), at 1600 nm ($T_{1600nm}$)) are also specified for some samples.

Examples 1 to 7 (Table 1-A (1-A') and 1-B (1-B')) illustrate the present application. Examples 1 to 4 and example 6 (optimization of example 4 for viscosity at liquidus) and 7 (optimization of example 4 for CTE and devitrification properties) are preferred. Example 6 is most particularly preferred.

Examples 1 to 5 relate to glasses and glass-ceramics of similar compositions with progressively varying contents of $Li_2O$ and ZnO. This can be seen more clearly by considering Tables 1-A' and 1-B' expressing the compositions as molar percentages. The concerned glasses have $T_{30\ Pa \cdot s}$ values progressively decreasing.

Examples A to D (Table 2) are comparative examples.

In examples A and B, the contents of $Al_2O_3$ and of ZnO lie outside the given ranges. The CTEs of the glass-ceramics are too high. The precursor glass of example B has devitrification into mullite, which is not favorable.

In example C, the MgO content is too high. Consequently, the CTE of the glass-ceramic is too high. The contents of $SiO_2$ and BaO likewise lie outside the given range.

In example D, the MgO content is too high. Consequently, the CTE of the glass-ceramic is unacceptable.

TABLE 1-A

| | Examples (wt %) | | | |
|---|---|---|---|---|
| | 1 | 2 | 3 | 4 |
| $SiO_2$ | 65.20 | 65.09 | 64.99 | 64.77 |
| $Al_2O_3$ | 20.58 | 20.55 | 20.51 | 20.45 |
| $Li_2O$ | 3.60 | 3.50 | 3.40 | 3.20 |
| MgO | 0.37 | 0.37 | 0.37 | 0.37 |
| ZnO | 1.77 | 2.03 | 2.28 | 2.79 |
| BaO | 2.46 | 2.45 | 2.45 | 2.44 |
| CaO | 0.45 | 0.45 | 0.45 | 0.45 |
| $TiO_2$ | 2.96 | 2.95 | 2.95 | 2.94 |
| $ZrO_2$ | 1.30 | 1.30 | 1.29 | 1.29 |
| $Na_2O$ | 0.60 | 0.60 | 0.60 | 0.60 |
| $K_2O$ | 0.22 | 0.22 | 0.22 | 0.22 |
| $SnO_2$ | 0.30 | 0.30 | 0.30 | 0.30 |
| $Fe_2O_3$ | 0.13 | 0.13 | 0.13 | 0.12 |
| $V_2O_5$ | 0.04 | 0.04 | 0.04 | 0.04 |
| $Cr_2O_3$ | 0.02 | 0.02 | 0.02 | 0.02 |
| $Na_2O + K_2O + BaO +$ $SrO + CaO$ | 3.73 | 3.72 | 3.72 | 3.71 |
| Properties of the glass | | | | |
| $T_{30Pa \cdot s}$ (° C.) | 1617 | 1612 | 1608 | 1604 |
| $\rho_{300P}$ (Ω · cm) | 3.3 | 3.8 | 4 | 4.3 |
| $T_{liq}$ (° C.) | 1283-1308 | 1323-1345 | 1322-1346 | 1320-1336 |
| Viscosity at $T_{liq}$ (Pa · s) | 990-1460 | 570-780 | 530-750 | 600-760 |
| Crystalline phase that devitrifies at the liquidus temperature | spinel | spinel | spinel | spinel |
| Properties of the glass-ceramic | | | | |
| Ceram 1: Tmax (° C.) aspect | 930 trans- parent colored | 920 trans- parent colored | 930 trans- parent colored | 930 trans- parent colored |
| $CTE_{25-700°\ C.}$ ($\times 10^{-7}\ K^{-1}$) | 1.0 | 2.1 | 1.5 | 2.0 |
| Ceram 2: Tmax (° C.) | | | 920 | 920 |
| TL (%) | | | 2.9 | 2.2 |
| Diffusion (%) | | | 0.4 | 0.6 |
| $T_{625\ nm}$ (%) | | | 7.9 | 6.2 |

TABLE 1-A

| | Examples (mol %) | | | |
|---|---|---|---|---|
| | 1 | 2 | 3 | 4 |
| $SiO_2$ | 71.14 | 71.14 | 71.14 | 71.14 |
| $Al_2O_3$ | 13.23 | 13.23 | 13.23 | 13.23 |
| $Li_2O$ | 7.91 | 7.70 | 7.49 | 7.07 |
| MgO | 0.60 | 0.60 | 0.60 | 0.60 |
| ZnO | 1.43 | 1.64 | 1.84 | 2.26 |
| BaO | 1.05 | 1.05 | 1.05 | 1.05 |
| CaO | 0.53 | 0.53 | 0.53 | 0.53 |
| $TiO_2$ | 2.43 | 2.43 | 2.43 | 2.43 |
| $ZrO_2$ | 0.69 | 0.69 | 0.69 | 0.69 |
| $Na_2O$ | 0.63 | 0.63 | 0.64 | 0.64 |
| $K_2O$ | 0.15 | 0.15 | 0.15 | 0.15 |
| $SnO_2$ | 0.13 | 0.13 | 0.13 | 0.13 |
| $Fe_2O_3$ | 0.05 | 0.05 | 0.05 | 0.05 |
| $V_2O_5$ | 0.02 | 0.02 | 0.02 | 0.02 |
| $Cr_2O_3$ | 0.01 | 0.01 | 0.01 | 0.01 |

TABLE 1-B

| | Examples (wt %) | | |
|---|---|---|---|
| | 5 | 6 | 7 |
| $SiO_2$ | 64.56 | 65.67 | 66.44 |
| $Al_2O_3$ | 20.38 | 19.67 | 19.08 |
| $Li_2O$ | 3.00 | 3.20 | 3.21 |
| MgO | 0.37 | 0.38 | 0.30 |
| ZnO | 3.30 | 2.57 | 2.35 |
| BaO | 2.43 | 2.44 | 2.44 |
| CaO | 0.45 | 0.45 | 0.45 |
| $TiO_2$ | 2.93 | 2.75 | 2.58 |
| $ZrO_2$ | 1.29 | 1.57 | 1.85 |
| $Na_2O$ | 0.59 | 0.60 | 0.60 |
| $K_2O$ | 0.22 | 0.22 | 0.22 |
| $SnO_2$ | 0.30 | 0.30 | 0.30 |
| $Fe_2O_3$ | 0.12 | 0.12 | 0.12 |
| $V_2O_5$ | 0.04 | 0.04 | 0.04 |
| $Cr_2O_3$ | 0.02 | 0.02 | 0.02 |
| $Na_2O + K_2O + BaO + SrO + CaO$ | 3.69 | 3.71 | 3.71 |
| Properties of the glass | | | |
| $T_{30Pa \cdot s}$ (° C.) | 1601 | 1617 | 1633 |
| $\rho_{300P}$ (Ω · cm) | 5.2 | 4.5 | 4.6 |
| $T_{liq}$ (° C.) | 1350-1360 | 1314-1331 | 1350-1360 |
| Viscosity at $T_{liq}$ (Pa · s) | 410-480 | 730-950 | 580-670 |
| Crystalline phase that devitrifies at the liquidus temperature | spinel | spinel | zircon |
| Properties of the glass-ceramic | | | |
| Tmax (° C.) | 930 | 930 | 930 |
| aspect | transparent colored | transparent colored | transparent colored |
| $CTE_{25-700° C.}$ (×$10^{-7}$ $K^{-1}$) | 2.5 | 1.5 | 0.0 |
| TL (%) | | 2.6 | 7.7 |
| Diffusion (%) | | 0.4 | 1.0 |
| $T_{625\,nm}$ (%) | | 7.7 | 18.6 |
| $T_{950\,nm}$ (%) | | 64 | |
| $T_{1600\,nm}$ (%) | | 68 | |

TABLE 1-B

| | Examples (mol %) | | |
|---|---|---|---|
| | 5 | 6 | 7 |
| $SiO_2$ | 71.14 | 71.90 | 72.61 |
| $Al_2O_3$ | 13.23 | 12.69 | 12.29 |

TABLE 1-B-continued

| | Examples (mol %) | | |
|---|---|---|---|
| | 5 | 6 | 7 |
| $Li_2O$ | 6.65 | 7.05 | 7.05 |
| MgO | 0.60 | 0.62 | 0.49 |
| ZnO | 2.68 | 2.07 | 1.89 |
| BaO | 1.05 | 1.05 | 1.05 |
| CaO | 0.53 | 0.52 | 0.52 |
| $TiO_2$ | 2.43 | 2.27 | 2.12 |
| $ZrO_2$ | 0.69 | 0.84 | 0.99 |
| $Na_2O$ | 0.64 | 0.63 | 0.63 |
| $K_2O$ | 0.15 | 0.15 | 0.15 |
| $SnO_2$ | 0.13 | 0.13 | 0.13 |
| $Fe_2O_3$ | 0.05 | 0.05 | 0.05 |
| $V_2O_5$ | 0.02 | 0.02 | 0.02 |
| $Cr_2O_3$ | 0.01 | 0.01 | 0.01 |

TABLE 2

| | Comparative examples (wt %) | | | |
|---|---|---|---|---|
| | A | B | C | D |
| $SiO_2$ | 65.58 | 65.78 | 66.99 | 65.06 |
| $Al_2O_3$ | 20.70 | 20.77 | 20.01 | 20.54 |
| $Li_2O$ | 3.30 | 3.00 | 3.00 | 3.00 |
| MgO | 0.37 | 0.37 | 1.30 | 1.18 |
| ZnO | 1.53 | 1.53 | 1.70 | 1.76 |
| BaO | 2.47 | 2.48 | 1.80 | 2.45 |
| CaO | 0.45 | 0.45 | — | 0.45 |
| $TiO_2$ | 2.98 | 2.99 | 3.01 | 2.95 |
| $ZrO_2$ | 1.31 | 1.31 | 1.40 | 1.30 |
| $Na_2O$ | 0.60 | 0.61 | 0.20 | 0.60 |
| $K_2O$ | 0.22 | 0.22 | 0.10 | 0.22 |
| $SnO_2$ | 0.30 | 0.30 | 0.30 | 0.30 |
| $Fe_2O_3$ | 0.13 | 0.13 | 0.13 | 0.13 |
| $V_2O_5$ | 0.04 | 0.04 | 0.04 | 0.04 |
| $Cr_2O_3$ | 0.02 | 0.02 | 0.02 | 0.02 |
| $Na_2O + K_2O + BaO + SrO + CaO$ | 3.74 | 3.76 | 2.1 | 3.72 |
| Properties of the glass | | | | |
| $T_{30Pa \cdot s}$ (° C.) | 1627 | 1635 | 1618 | — |
| $\rho_{300P}$ (Ω · cm) | 3.9 | 4.8 | 5.1 | — |
| $T_{liq}$ (° C.) | 1310-1326 | 1334-1354 | — | — |
| Viscosity at $T_{liq}$ (Pa · s) | 910-1170 | 670-900 | — | — |
| Crystalline phase that devitrifies at the liquidus temperature | spinel | mullite | — | — |
| Properties of the glass-ceramic | | | | |
| Tmax (° C.) | 930 | 930 | 920 | 930 |
| aspect | transparent colored | transparent colored | transparent colored | transparent colored |
| $CTE_{25-700° C.}$ (×$10^{-7}$ $K^{-1}$) | 3.6 | 5.1 | 7.2 | 9.1 |

The invention claimed is:

1. A transparent glass-ceramic of lithium aluminosilicate containing a solid solution of β-quartz as a main crystalline phase, a composition of which, free of arsenic oxide and antimony oxide, except for inevitable traces, expressed in percentages by weight of oxides, comprises:
64.5% to 66.5% of $SiO_2$;
19.0% to 20.6% of $Al_2O_3$;
3.0% to 3.6% of $Li_2O$;
0 to 1% of MgO;
1.7% to 3.4% of ZnO;
2% to 3% of BaO;
0 to 3% of SrO;
0 to 1% of CaO;

2% to 4% of $TiO_2$;
1% to 2% of $ZrO_2$;
0 to 1% of $Na_2O$;
0 to 1% of $K_2O$;
greater than 0.02% to 0.1% of $Cr_2O_3$;
with $Na_2O+K_2O+BaO+SrO+CaO \leq 6\%$ and $0.07\% \leq V_2O_5+Fe_2O_3+Cr_2O_3 \leq 0.39\%$; and
optionally up to 2% of at least one fining agent comprising $SnO_2$.

2. The glass-ceramic according to claim 1, wherein the composition comprises 3.1% to 3.5% of $Li_2O$.

3. The glass-ceramic according to claim 1, wherein the composition comprises 1.7% to 2.8% of ZnO.

4. The glass-ceramic according claim 1, wherein the composition comprises 0.01 to 1% of MgO.

5. The glass-ceramic according to claim 1, wherein the composition comprises 0.05% to 0.6% of $SnO_2$.

6. The glass-ceramic according to claim 1, wherein the composition further comprises $V_2O_5$ as coloring agent, alone or mixed with at least one other coloring agent selected from CoO and $Fe_2O_3$.

7. The glass-ceramic according to claim 1, having a coefficient of thermal expansion $CTE_{25-700°C}$ in the range $+/-3 \cdot 10^{-7} K^{-1}$.

8. An article constituted at least in part of a glass-ceramic according to claim 1.

9. The glass-ceramic of claim 5, wherein the composition comprises 0.15 to 0.4% of $SnO_2$.

10. The glass-ceramic according to claim 1, wherein the composition comprises:
0.005% to 0.2% of $V_2O_5$;
0.01% to 0.32% of $Fe_2O_3$; and
0% to 0.1% of CoO.

11. The glass-ceramic according to claim 1, wherein the composition comprises:
0.015% to 0.1% of $V_2O_5$;
0.07% to 0.25% of $Fe_2O_3$; and
greater than 0.02% to 0.04% of $Cr_2O_3$.

* * * * *

UNITED STATES PATENT AND TRADEMARK OFFICE
CERTIFICATE OF CORRECTION

PATENT NO. : 11,247,935 B2
APPLICATION NO. : 16/620302
DATED : February 15, 2022
INVENTOR(S) : Marie Comte et al.

It is certified that error appears in the above-identified patent and that said Letters Patent is hereby corrected as shown below:

In the Claims

In Column 15, Line 14, Claim 4, delete "according claim" and insert -- according to claim --.

Signed and Sealed this
Seventeenth Day of May, 2022

Katherine Kelly Vidal
*Director of the United States Patent and Trademark Office*